US007925681B2

United States Patent
Sreenivas et al.

(10) Patent No.: US 7,925,681 B2
(45) Date of Patent: Apr. 12, 2011

(54) BYPASS OF THE NAMESPACE HIERARCHY TO OPEN FILES

(75) Inventors: Mahesh K. Sreenivas, Sammamish, WA (US); Stefan R. Steiner, Sammamish, WA (US); Arkadi Brjazovski, Redmond, WA (US); Sameet H. Agarwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 109 days.

(21) Appl. No.: 11/413,225

(22) Filed: Apr. 28, 2006

(65) Prior Publication Data

US 2007/0255699 A1    Nov. 1, 2007

(51) Int. Cl.
*G06F 12/00* (2006.01)

(52) U.S. Cl. ........................................................ 707/822

(58) Field of Classification Search .................. 707/3, 6, 707/201, 791, 821, 822
See application file for complete search history.

(56) References Cited

U.S. PATENT DOCUMENTS

| | | | | | |
|---|---|---|---|---|---|
| 5,999,976 | A | * | 12/1999 | Schmuck et al. | 709/226 |
| 6,023,706 | A | * | 2/2000 | Schmuck et al. | 707/200 |
| 6,119,133 | A | * | 9/2000 | Nusbickel et al. | 707/205 |
| 6,356,863 | B1 | * | 3/2002 | Sayle | 703/27 |
| 7,016,976 | B2 | * | 3/2006 | Merrells et al. | 709/245 |
| 7,047,257 | B2 | * | 5/2006 | Fletcher et al. | 707/201 |
| 7,197,516 | B1 | * | 3/2007 | Hipp et al. | 707/200 |
| 2002/0184230 | A1 | * | 12/2002 | Merrells et al. | 707/102 |
| 2003/0009484 | A1 | * | 1/2003 | Hamanaka et al. | 707/200 |
| 2004/0163020 | A1 | * | 8/2004 | Sidman | 714/100 |
| 2004/0255048 | A1 | * | 12/2004 | Lev Ran et al. | 709/249 |
| 2005/0004925 | A1 | * | 1/2005 | Stahl et al. | 707/100 |
| 2005/0044523 | A1 | * | 2/2005 | Wendt | 717/100 |
| 2005/0065986 | A1 | * | 3/2005 | Bixby et al. | 707/204 |
| 2005/0149525 | A1 | * | 7/2005 | Verma et al. | 707/8 |
| 2006/0123062 | A1 | * | 6/2006 | Bobbitt et al. | 707/200 |
| 2006/0133407 | A1 | * | 6/2006 | Kuisma | 370/447 |
| 2006/0165040 | A1 | * | 7/2006 | Rathod et al. | 370/335 |
| 2006/0206450 | A1 | * | 9/2006 | Fletcher et al. | 707/1 |
| 2006/0235894 | A1 | * | 10/2006 | Rasmussen et al. | 707/200 |
| 2007/0038689 | A1 | * | 2/2007 | Shinkai | 707/205 |
| 2007/0055703 | A1 | * | 3/2007 | Zimran et al. | 707/200 |
| 2007/0101256 | A1 | * | 5/2007 | Simonyi | 715/511 |
| 2007/0156710 | A1 | * | 7/2007 | Kern et al. | 707/100 |
| 2007/0174310 | A1 | * | 7/2007 | Arrouye et al. | 707/100 |
| 2007/0185852 | A1 | * | 8/2007 | Erofeev | 707/4 |
| 2007/0185938 | A1 | * | 8/2007 | Prahlad et al. | 707/204 |

OTHER PUBLICATIONS

U.S. Appl. No. 11/356,940, filed Feb. 17, 2006, Brjazovski.

* cited by examiner

*Primary Examiner* — Charles Kim
*Assistant Examiner* — Mohammed R Uddin
(74) *Attorney, Agent, or Firm* — Woodcock Washburn LLP

(57) ABSTRACT

A file namespace hierarchy bypass and method to access files are provided. The bypass can be employed, for example, as a computer-readable medium with instructions for generating a unique identifier associated with a file and instructions for accessing the file based on the unique identifier and a specified search space. A computer-readable medium having instructions for obtaining the unique identifier and specified search space associated with the file and instructions for generating a path designation by combining the unique identifier and the specified search space used to access the file may also be employed. The method for bypassing the namespace hierarchy of the file, for example, may include passing the unique identifier and specified search space to a program and accessing the file based on a path designation generated by the program by combining the unique identifier and specified search space.

14 Claims, 4 Drawing Sheets

US 7,925,681 B2

BYPASS OF THE NAMESPACE HIERARCHY TO OPEN FILES

CROSS REFERENCE TO RELATED APPLICATION SECTION

This application is related to application Ser. No. 11/356,940, filed Feb. 17, 2006, entitled "MECHANISM TO EXCHANGE PRIMARY DATA STREAM OF A FILE."

BACKGROUND

Computer users continue to store and share more files in richer ways as the internet, communications and broadband technologies improve and expand their reach. While there are many benefits that come with this explosive growth of electronic information, users are becoming more challenged to find and reuse files that they once created or used. The following scenario will be used as an example to illustrate this challenge.

A user, named Fred, receives a file attached to an email from his colleague, Sam. The attachment is a written document describing the goals of a project Fred and Sam are leading. Fred makes a few changes to the document and saves the file on his local computer. He also starts to draft a new document that lays out the milestones for the project. Fred does not want to rewrite the project objectives in his milestones document so he embeds a link in the milestones document to the objectives document so that anyone who is reading his milestones document can link directly to the objectives document. Fred saves both the milestones document and the objectives document on a share that both Fred and Sam have permission to access. Fred changes the name on the objectives document to make it clear that the document includes his modifications and emails Sam the link to the milestones document stored on the common share.

Sam opens the milestones document and then clicks on the objectives document link that Fred has embedded so that Sam can see the changes Fred has made to the objectives. Sam is presented with a message on the display of his computer explaining that the objectives document can not be found. Sam does not know why the file can not be found and he does not know how to find it. So he needs to wait for Fred to correct the link or tell him where the file is stored and the name under which it is stored.

This scenario is further illustrated in FIG. 1. FIG. 1 shows the file names and path relationships associated with this scenario. The file 10 that Sam created is stored on the C drive of his computer in his Documents folder under the name "Objectives". Thus the file name is C:\Documents\Objectives. Similarly when Sam sends the file to Fred, Fred saves the file 12 on his computer's C drive in his documents folder under the name C:\Documents\Objectives and this is the link that Fred includes in his milestones document. Fred creates and saves the milestone document as file 14 under the name of C:\Documents\Milestones on his computer. When Fred saves the milestones document on the common share he uses the S drive and the folder on that drive called "Documents". The shared milestones file 18 is named S:\Documents\Milestones. Fred had also moved the objectives document, file 12, onto the common share under the new name S:\Documents\objectives(Fred) to create a shared objectives file 16 but he did not update the link embedded in the shared milestones file 18. Consequently, when Sam tried to open the file by accessing the link from the shared milestone file 18 it pointed him back to file 12 which had been moved and renamed as shared objectives file 16.

Most files today are created with a namespace name that includes the path where the file is stored and the user-given name. In the scenario described above the namespace name for file 10 is C:\Documents\Objectibes where C:\Documents is the path and Objectives is the name that Sam created for the file. As illustrated, however, the path and name of a file may change over the lifetime of the file making it difficult to ensure that these changes are tracked and updated so that the file can be opened despite any changes in its namespace name.

Some file systems are capable of tracking changes. For example, the Windows NTFS file system includes a Change Journal such as an Update Sequence Number (USN) Journal that tracks file namespace changes. However, because not all files are meant to be shared across users and applications the tracking information from the Change Journal is only available to certain applications and users with the highest security permissions. For example, in the scenario discussed above, Sam should not have access to the objectives document file 12 stored on Fred's computer unless Fred authorized Sam to have access. Nor should Sam be able to obtain information about what files are stored on Fred's computer without permission. Accordingly, except for administrators with the highest security permissions computer applications are not developed to utilize the tracking features of the Change Journal.

There are also some file systems that will create a unique file or object ID associated with certain files when they are created that are persistent and do not change even when the namespace name is changed. While having a unique and persistent identifier associated with a file may simplify the tracking of a file that has changed path or name over the course of its lifetime, there is currently no mechanism for users without the highest of security permissions or applications that are designed to open files using the namespace name to open a file when the namespace name has been changed although doing so would not have been a breach of any security conditions.

It should be understood that many other scenarios are possible in which the namespace name changes preventing the opening of a desired file.

SUMMARY

This Summary is provided to introduce a selection of concepts in a simplified form that are further described below in the Detailed Description. This Summary is not intended to identify key features or essential features of the illustrative embodiment, nor is it intended to be used as an aid in determining the scope of the claimed subject matter.

Program instructions and methods are provided to bypass the namespace name hierarchy in order to access a file. In one illustrative example, a unique number generator generates a unique identifier and the file system accesses a file based on the unique identifier. The unique identifier is associated, by a file system, with the file and does not change even if the namespace name for the file changes. The file system also uses a specified search space which adheres to all applicable security permissions in combination with the unique identifier to form a path designation that is used to access the file. If the file is moved to a location outside the specified search space the file will not be opened. If the file is moved to a shared location in which permission has been granted to access the file, the file in the shared location can be accessed using the path designation.

According to one illustrative method for bypassing the namespace hierarchy to access a file, an application passes the unique identifier and the specified search space to a program which may include a file system application programming interface. The program which may also include a file system, combines the unique identifier and specified search space into a path designation and uses the path designation to access the file. The search space in this illustrative example is defined by a tree rooted in a store corresponding to the file's location. If the file's namespace name change, for example, by moving the file to a second location, the file is still accessed as long as the second location remains within the specified search space.

In another illustrative example, program instructions such as an application are described. The application includes instructions for obtaining the unique identifier associated with the file, for example, by requesting the unique identifier from a file system application programming interface. The application also may include instructions for obtaining the specified search space based on the location where the file is stored. A further set of instructions are provided to combine the unique identifier with the specified search space to form a path designation that may be used to access a file independent from its namespace name so long as the file location remains within the specified search space.

DETAILED DESCRIPTION

Figure 1:
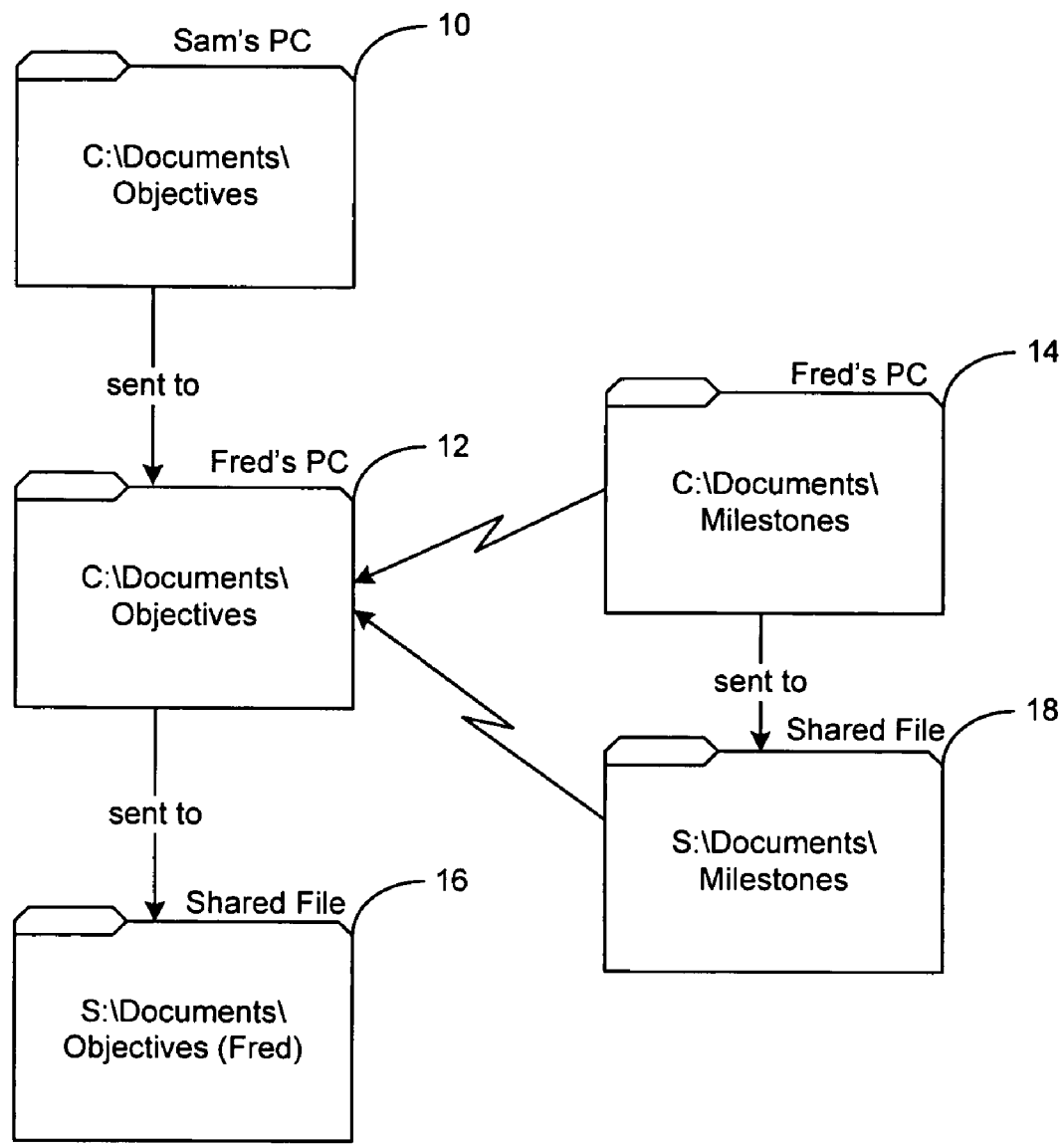
FIG. 1 shows the file names and path relationships associated with a namespace name change scenario.

An illustrative embodiment of the present invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As mentioned in the Background, there is currently no mechanism for opening a file that has undergone a namespace name change where the user is not granted broad security permissions or where the application is not designed for use by administrators with broad security permissions. The illustrative embodiment provides a mechanism to bypass the namespace hierarchy and to open a file that can be found within a permissible search space.

Figure 2:
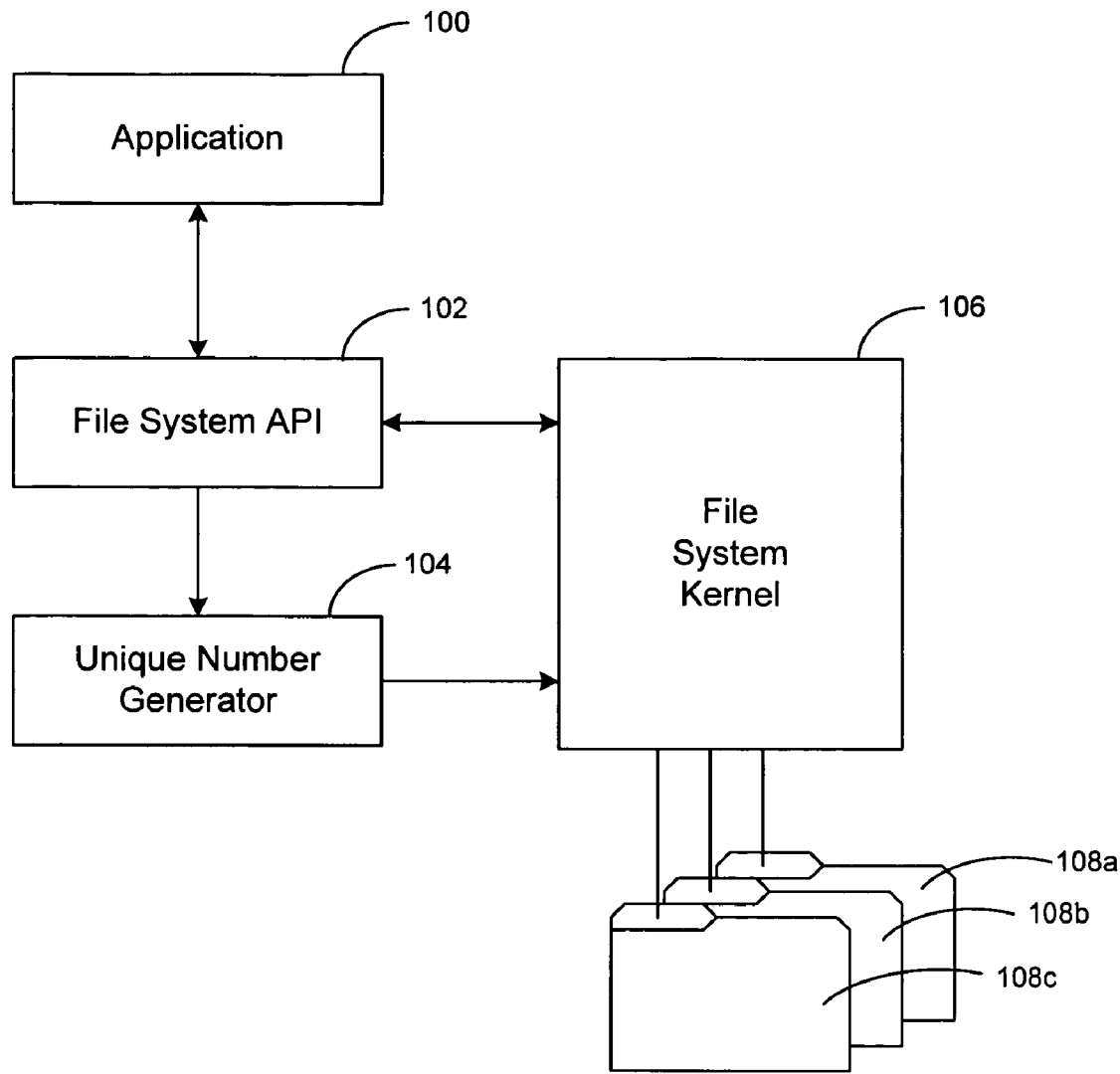
FIG. 2 shows a block diagram of a relevant computing environment.

FIG. 2 shows a block diagram of a computing environment in which the illustrative embodiment is employed. A computer application 100 communicates with a File System Application Programming Interface (API) 102 to open and save files. The application may provide a variety of functions such as, but not limited to word processing, spreadsheet, presentation, drawing, photo organization and editing, audio/visual organization and editing, email, and the like, and be used to create files with various data types forming the contents of the files. When a new file is being saved by the application 100, the File System API 102 communicates with the unique number generator 104 that generates and returns a statistically random number (hereinafter "unique identifier"). The File System API 102 and the unique number generator 104 communicate with the File System Kernel to store files 108a, 108b and 108c in association with both their namespace names and their respective unique identifiers. Storing the namespace name and the unique identifier in association with the file is described in more detail in the patent application entitled "MECHANISM TO EXCHANGE PRIMARY DATA STREAM OF A FILE", application Ser. No. 11/356, 940 filed on Feb. 17, 2006 which is incorporated herein by reference. It should be understood that numerous methods of generating unique numbers are known to those skilled in the art such as a Globally Unique Identifier (GUID) generator and the like, and that the unique number generator shown in FIG. 2 is not intended to be limited to any one algorithm or generator.

According to one illustrative embodiment, the File System API 102 combines a specified search space and the unique identifier to generate a path designation that the File System Kernel 106 can use to access the file where accessing the file includes, but is not limited to any one or more of opening, viewing, reading, writing, moving, copying, rendering, and the like. The specified search space, as is explained in more detail below, meets requirements for security permissions and the unique identifier persists with the file even if the file path or name has changed.

Figure 3A:
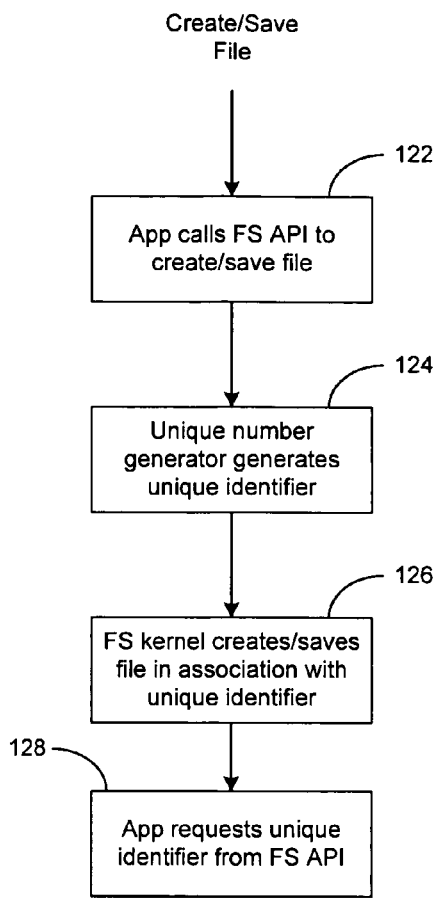
FIG. 3a shows a flow chart for an exemplary method of creating a file associated with a unique identifier.

FIG. 3a shows a flow chart for a method of creating a file in accordance with the illustrative embodiment. A user creates a file by saving the file through an interface of the application. The application receives an input from the user to create or save a file and calls the File System API at step 122. The unique number generator generates a unique identifier to be associated with the file at step 124. The File System Kernel creates or saves the file in association with the unique identifier at step 126. At step 128, the application may request the unique identifier associated with the file that was created or saved. Many programming techniques could be used to request or obtain the unique identifier from the file system and are known to those skilled in the art. For example, an application running on theWindows File System may call a public API such as GetIdForPath.

Figure 3B:
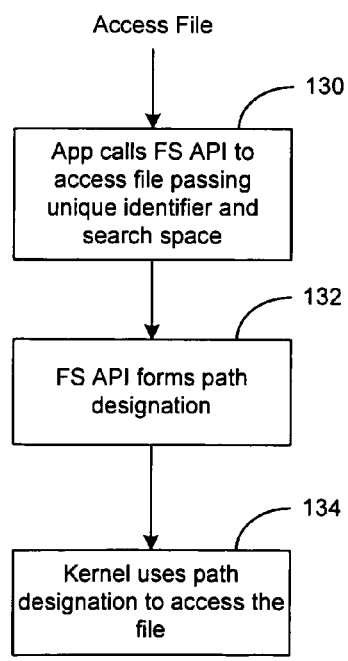
FIG. 3b shows a flow chart for a method of accessing a file after the file's namespace name has changed.

After the file has been created as shown in FIG. 3a, it may undergo a namespace name change. FIG. 3b is a flow chart showing a method for accessing the file after it has undergone such a namespace name change. If the application either did not previously request the unique identifier from the file system or if it did not retain the unique identifier, the application may request the unique identifier at step 130 in the manner described above. The application is still able to open that file after the namespace name has changed according to this aspect of the illustrative embodiment by passing the unique identifier and specified search space to the File System API at step 130 which in turn creates a path designation at step 132. The file system kernel uses the path designation to locate and open the file at step 134.

The following description refers to an exemplary implementation of an application developed for the Windows File System (WinFS) to further illustrate steps 130, 132 and 134. The format of the file path is defined as follows:

\\machinename\WinFSShare\~$WinFS$_ItemId@{<ItemIDGuid>} where ItemId is the unique identifier. The Item Domain in WinFS, or the specified search space, is defined by the parent of the ~~$WinFS$_ItemId@{ . . . } path. For example, consider the following ItemId path:

\\winfstst\Defaultstore\user\fred\~~$WinFS$_ItemId@ {0C092C29-882C-11CF-A6BB-0080C7B2D682}.

In this case, winfstst is the name of the machine, and Defaultstore is a share in WinFS. The path prefix \user\fred further extends the scope and narrows the search space to only the namespace sub-tree rooted at the folder named fred. The file has an ItemId of {0C092C29-882C-11CF-A6BB-0080C7B2D682}. The application recognizes \\winfstst\Defaultstore\user\fred as the specified search space when Fred, in this example, first creates the file with a unique identifier 0C092C29-882C-11CF-A6BB-0080C7B2D682.

In order for WinFS to open this exemplary file, the file remains within the \\winfstst\Defaultstore\user\fred item domain. Consequently, the file is opened successfully with the ItemId when the file is present in a sub-tree rooted at \\winfstst\Defaultstore\user\fred. If the file is not present within a sub-tree rooted in \\winfstst\Defaultstore\user\fred, attempts to open the file will fail. This will prevent a user from accessing items which are not within their item domain, the search space for which that user has access permission.

Figure 4:
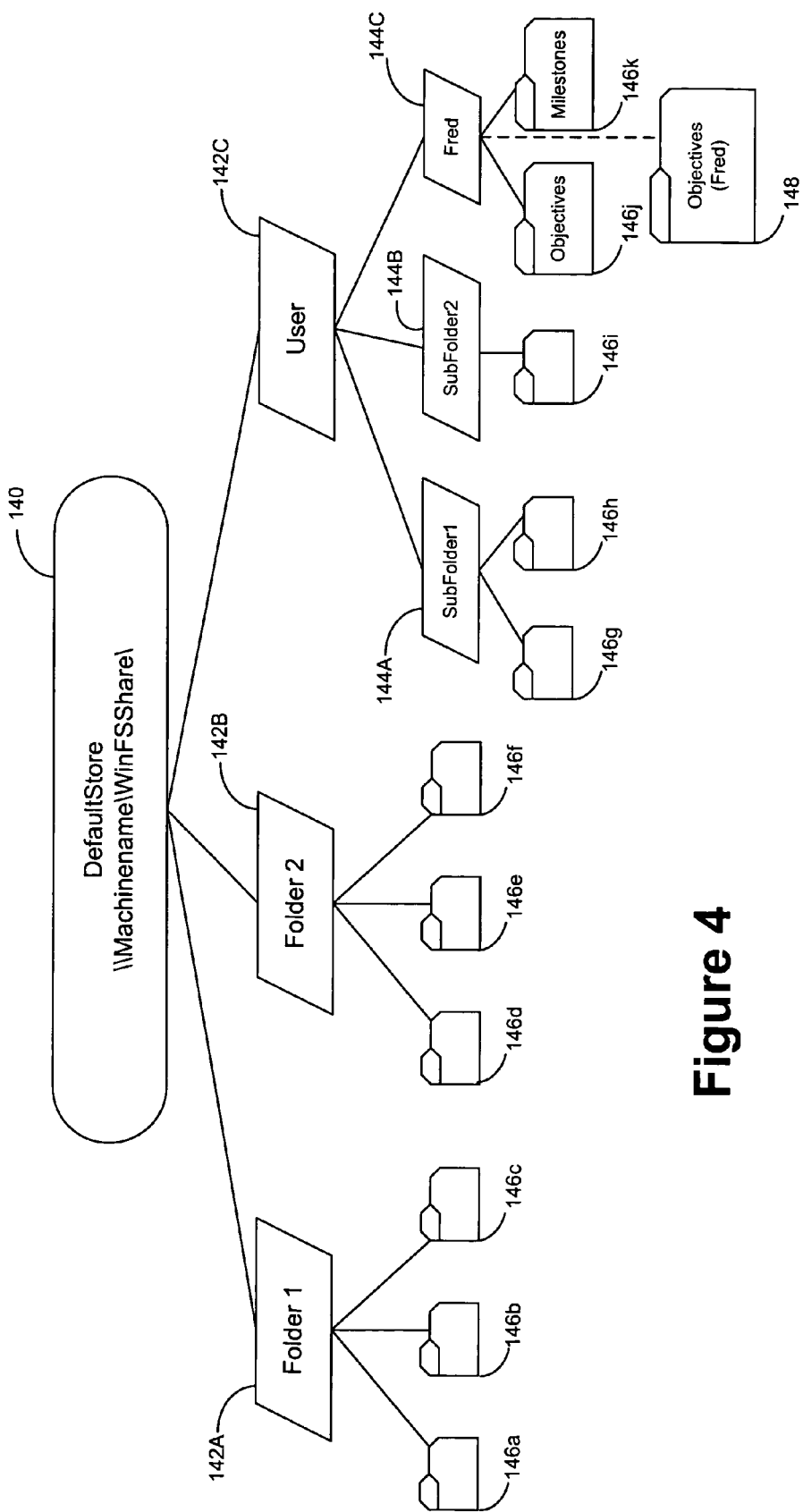
FIG. 4 shows an exemplary search space tree structure.

FIG. 4 shows an exemplary search space tree structure representing Fred's files described in the scenario discussed in the background hereinabove. The defaultstore 140 in the exemplary WinFS embodiment is shown as \\machinename\WinFSShare\. A plurality of folders 142a, 142b and 142c are shown rooted in the defaultstore 140. A plurality of sub folders 144a, 144b, and 144c are rooted in folder 142c which in this example has been named "user." Further, a plurality of files 146a through 146k are shown rooted from one of the folders 142a, 142b, 144a, 144b, and 144c. Returning to the scenario discussed in the background and assuming that Fred's computer was using WinFS, file 146j represents the objectives document and file 146k represents the milestones document, both of which are stored in folder 144c which is named "fred". Consequently, the link that Fred inserted into the milestones document to access the objectives document, file 146i, syntactically would be as follows:

\\machinename\WinFSShare\user\fred\~~$WinFS$_ItemId@{<ItemIDGuid>} where the itemId is the unique identifier for file 146j. Fred may share files in Folder 144c with Sam by granting Sam permission to open files in the folder \user\fred\ rooted in the defaultstore using an access control list or other method of granting access rights known by those skilled in the art. If Fred renames file 146j as "objectives(fred)", shown as file 148, the link he has embedded in milestones file 146k will still open the desired file because the ItemId will have remained the same and renamed file 148 can be found within the specified search space of \\machinename\WinFSShare\user\fred\.

Recall that the File System API combines the specified search space and the unique identifier to form the path designation that is used by the File System Kernel to open the file. If the syntax for the path designation is modified for the file system after the file is created it is preferred to include a mechanism for requesting the path designation according to the new syntax when the file is next accessed by the application. In the exemplary WinFS embodiment, an API is provided that returns the path designation given the item domain and the ItemId. That way if the path designation syntax changes, only this function will need to be updated. An exemplary API definition is as follows:

GetItemIdFilePath (String itemDomain, Guid itemId, out String itemIdPath);

It should be understood that the function name, parameters and syntax of such API should not be limited to this example and that alternative, or additional APIs may be provided which instead of returning the path designation, forms the path designation and provides it as an input to the File System Kernel following a change in syntax.

What has been described above includes examples of the illustrative embodiment. It is, of course, not possible to describe every conceivable combination of components or methodologies for purposes of describing the claimed subject matter, but one of ordinary skill in the art may recognize that many further combinations and permutations of the illustrative embodiment are possible. Accordingly, the present document is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A tangible computer-readable storage medium having computer readable instructions stored thereon, the tangible computer-readable storage medium comprising:
   instructions for randomly generating an persistent unique identifier associated with a file, wherein the persistent unique identifier remains unchanged when a namespace associated with the file is changed;
   instructions for storing the file in the file system, the file associated with a file path that defines a path in the file system to the file, wherein the file path includes information identifying a namespace;
   instructions for attaching the persistent unique identifier to the file path;
   instructions for receiving, by a file system application program interface, the persistent unique identifier and the namespace associated with the file;
   instructions for searching, by the file system application program interface the file system using the persistent unique identifier and the namespace as search parameters;
   instructions for locating the file; and
   instructions for accessing the file.

2. The tangible computer-readable storage medium of claim 1, wherein the file path is defined by at least information that identifies a machine name, a user, and a store.

3. The tangible computer-readable storage medium of claim 1, further comprising:
   instructions for denying a request to access the file received from a entity associated with a namespace different than the namespace associated with the file.

4. The tangible computer-readable storage medium of claim 1, wherein the information that identifies the namespace is shared between multiple namespaces.

5. The tangible computer-readable storage medium of claim 4, wherein the instructions for accessing the file further comprise:
   instructions for accessing the file based on the persistent unique identifier and the information that indicates that the namespace is shared between multiple namespaces.

6. The tangible computer-readable storage medium of claim 1, wherein the information that identifies the namespace is syntactically defined in terms of a specified machine, a specified file store, and a specific user folder.

7. A computer implemented method of accessing a file comprising:
- randomly generating, by a unique number generator, a persistent unique identifier for a file being stored in a file system;
- attaching the persistent unique identifier to a file path to the file being stored in the file system, wherein the file path defines a path in the file system to the file and the file path includes information identifying a namespace;
- receiving, by a file system application program interface, the persistent unique identifier from an application;
- generating, by the file system application program interface, a path designation for the file by combining the unique identifier with the information that identifies the namespace;
- locating the file based on the path designation for the file; and
- accessing, by the file system, the file.

8. The computer implemented method of claim 7, wherein the information that identifies the namespace includes information that identifies a user account that was active when the file was created.

9. The computer implemented method of claim 8, further comprising:
- moving the file to a second location thereby changing the path to the file, wherein the second location is within the namespace; and
- accessing the file at the second location using the path designation.

10. The computer implemented method of claim 7, wherein the unique identifier does not change when the file path to the file changes.

11. A computer system, comprising:
- a processor;
- a memory coupled to the processor, the memory including executable instructions that upon execution cause the computer system to access a file, the memory including;
- instructions for receiving, by a file system application program interface, a request to save a file from an application;
- unique number generator instructions for randomly generating a persistent unique identifier associated with the file;
- instructions for saving the file to the file system of an operating system,
- instructions for attaching the persistent unique identifier to a file path to the file in the file system, wherein the file path includes information that identifies a namespace that identifies a user account that is active when the file was created;
- instructions for receiving a request to search for the file from the application; instructions for searching the file system for the file, wherein the search uses the persistent unique identifier and the namespace as search parameters;
- instructions for locating the file; and
- instructions for sending the file to the application.

12. The computer system of claim 11, wherein the memory further comprises:
- instructions for sending the persistent unique identifier and the namespace to the application.

13. The computer system of claim 11, wherein the persistent unique identifier remains unchanged when the file path has changed.

14. The computer system of claim 11, wherein the memory further comprises:
- instructions for sending a failure message to the application in response to determining that an active user account does not have permission to access files associated with the namespace.

* * * * *